US011163625B2

(12) United States Patent
 Halliday

(10) Patent No.: US 11,163,625 B2
(45) Date of Patent: Nov. 2, 2021

(54) OPTIMIZING LOGGING OF DECISION OUTCOMES IN DISTRIBUTED TRANSACTIONS

(71) Applicant: Red Hat, Inc., Raleigh, NC (US)

(72) Inventor: Jonathan Halliday, Newcastle Upon Tyne (GB)

(73) Assignee: Red Hat, Inc., Raleigh, NC (US)

( * ) Notice: Subject to any disclaimer, the term of this patent is extended or adjusted under 35 U.S.C. 154(b) by 81 days.

(21) Appl. No.: 16/106,559

(22) Filed: Aug. 21, 2018

(65) Prior Publication Data

US 2020/0065176 A1   Feb. 27, 2020

(51) Int. Cl.
*G06F 11/00* (2006.01)
*G06F 11/07* (2006.01)
*G06F 11/34* (2006.01)
*G06F 9/46* (2006.01)

(52) U.S. Cl.
CPC .......... *G06F 11/0745* (2013.01); *G06F 9/466* (2013.01); *G06F 11/3476* (2013.01)

(58) Field of Classification Search
CPC combination set(s) only.
See application file for complete search history.

(56) References Cited

U.S. PATENT DOCUMENTS

| 8,166,094 B2* | 4/2012 | D'Costa | G06F 16/10 |
| | | | 709/201 |
| 8,352,421 B2* | 1/2013 | Little | G06F 16/2365 |
| | | | 707/609 |
| 2011/0047413 A1* | 2/2011 | McGill | G06F 11/1662 |
| | | | 714/15 |
| 2018/0276234 A1* | 9/2018 | Wei | G06F 16/1734 |
| 2019/0121888 A1* | 4/2019 | Wei | G06F 16/2379 |

FOREIGN PATENT DOCUMENTS

WO   2016122710 A1   8/2016

OTHER PUBLICATIONS

Youyou Lu et al., "Improving the Performance and Endurance of Persistent Memory with Loose-Ordering Consistency", IEEE Transactions on Parallel and Distributed Systems, vol. 15, No. 11, Nov. 2016, 15 pages.
Dmitriy Setrakyan, "Two-Phase-Commit for In-Memory Caches—Part II", DZone Database, Sep. 11, 2014, 4 pages.

* cited by examiner

*Primary Examiner* — Amine Riad
(74) *Attorney, Agent, or Firm* — Lowenstein Sandler LLP

(57) ABSTRACT

Systems and methods are described for optimizing logging of decision outcomes in distributed transaction protocols. An example method may comprise: executing, by a processing device, a transaction manager to coordinate a distributed transaction for a plurality of participants, transmitting, by the processing device via the transaction manager, prepare messages to the plurality of participants, and while waiting to receive responses from each of the plurality of participants, serializing a transaction log record of the distributed transaction.

20 Claims, 10 Drawing Sheets

OPTIMIZING LOGGING OF DECISION OUTCOMES IN DISTRIBUTED TRANSACTIONS

TECHNICAL FIELD

The present disclosure is generally related to distributed transactions in computer systems, and more particularly, to optimizing logging of decision outcomes in distributed transactions.

BACKGROUND

Distributed transactions are often performed on distributed computing systems. A distributed transaction is a set of operations that update shared objects. Distributed transactions should satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property ensures that the transaction does not violate integrity constraints of the shared objects. The Isolation property ensures that intermediate effects of the transaction are not detectable to concurrent transactions. Finally, the Durability property ensures that changes to shared objects due to the transaction are permanent.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
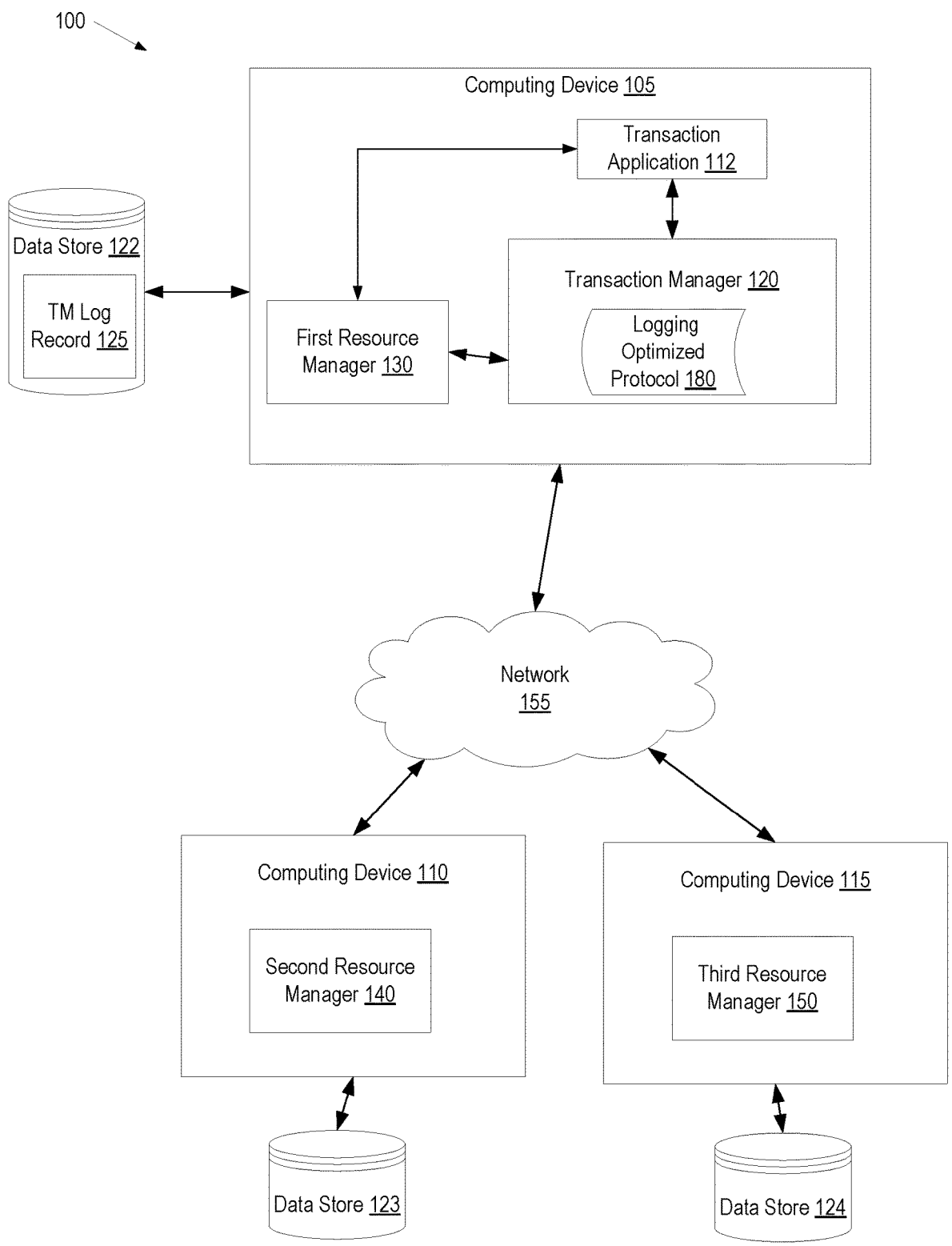
FIG. 1 depicts a high-level block diagram of an example computer system architecture, in accordance with one or more aspects of the disclosure.

Described herein is a system for optimizing logging of decision outcomes in distributed transactions. A distributed transaction is a set of operations that update shared objects. Distributed transactions often, but not always, utilize a two-phase commit protocol (including a "presumed abort" optimization) that is a distributed algorithm that coordinates all the processes that participate in the transaction on whether to commit or abort the transaction. The two phase commit protocol includes two phases: a commit-request phase and a commit phase. In the commit-request phase, a coordinator (e.g., transaction manager) prepares (via prepare messages) a transaction's participating processes (referred to herein as "participants") to take the steps to either commit or abort the transaction, and to vote commit or abort with respect to the transaction. In the commit phase, the coordinator decides, based on the responses (transaction votes) to the prepare messages from the participants (e.g., participating processes including one or more computing operations updating shared objects), whether to commit (if all participants voted commit) or abort (at least one participant voted abort) the transaction and notifies the participants of the results.

In the conventional two-phase commit distributed transaction, significant latency of the computer system and processor is experienced when a coordinator is waiting on responses to prepare messages from the participants. For example, conventionally, the coordinator does not proceed with serializing (e.g., gathering information on the transaction and organizing such information in a particular manner) the state of the distributed transaction or writing such serialized state to disk until all responses are received from participants and a decision (e.g., decision outcome) on the transaction is made.

A persistent log (also referred to herein as a "transaction log record") may be used by a coordinator to serialize and log a decision outcome of the distributed transaction. To maintain the ACID properties of the distributed transaction, in particular fault tolerance, the persistent log is conventionally written to disk using block-level writes (e.g., 4 KB block writes to disk storage). Such block-level writes can be time-consuming and, as such, are typically not performed until after all responses are received from participants in the commit-request phase and a decision outcome is determined for the distributed transaction. As a result, latency is introduced to the system while waiting for the responses, as the processor may remain idle in terms of operations (e.g., persistent log preparation and writing) being performed for the distributed transaction.

Some conventional systems have implemented optimizations to the two-phase commit distributed transaction with the aim of improving processing time of the distributed transaction. These optimizations include the alternative protocol of "presumed abort" or "presumed commit" assumptions, in addition to the baseline unoptimized approach of "presumed nothing." However, these optimizations and the baseline approach did not address the latency introduced by the coordinator delaying serialization and persistence of the state of the distributed transaction until the transaction decision outcome is determined.

Aspects of the disclosure address the above and other deficiencies by providing technology that optimizes logging of decision outcomes in distributed transactions. With the introduction of more advanced memory technology, such as persistent memory that provides fault tolerance and byte-addressable access, additional optimizations may be introduced to two-phase commit distributed transaction technology. As described in greater detail below, a transaction manager may coordinate a distributed transaction using a logging optimized two-phase protocol. The logging optimized two-phase protocol may reduce the overall execution time (latency) of a transaction by implementing at least two optimizations for logging of the decision outcome of the distributed transaction. The first optimization performs serialization of a transaction log record for the distributed transaction in parallel with receiving responses to prepare messages of the distributed transaction. The second optimization speculatively writes, in parallel with receiving responses to prepare messages of the distributed transaction, the transaction log record to persistent memory using byte-addressable chunks and a valid/invalid flag that is part of the log record.

As such, the systems and methods described herein include technology that enhances logging of decision outcomes in distributed transactions technology for a computer system. In particular, aspects of the disclosure provide technology that enhances the efficiency and/or performance of distributed transactions in a computer system. The technology enables the parallel execution of serialization and persistence of the transaction log record for the distributed transaction by the coordinator during the commit-request phase of the distributed transaction. This may enhance the efficiency and performance of the computer system by reducing overall latency of the system while the transaction log record is written to persistent memory. This may decrease both the processor cycles and input/output (I/O) overhead required to manage distributed transactions of the computer system. The performance enhancements may enable a computing system to reduce the amount of computing resources consumed by a distributed transaction coordinator and enable the computing system to support more distributed transactions.

Various aspects of the above referenced methods and systems are described in details herein below by way of examples, rather than by way of limitation. For example, while implementations of the disclosure are discussed herein in terms of the two-phase commit protocol as an example, other applications of the disclosure are envisioned for distributed transactions. For example, the election process of a leader process from among a group of peers in a distributed transaction can involve a distributed consensus process utilizing the communication and persistent logging at issue herein. This distributed consensus election process can benefit from the optimizations described herein. In addition, the optimizations discussed in the disclosure can be applied to other types of distributed transactions involving a distributed consensus, such as compensating transaction/sagas and/or three-phase commit transactions. Furthermore, the disclosure is described herein in terms of the example "presumed-abort" standard. However, the disclosure may be similarly applied to distributed transactions implementing the "presumed-nothing" or "presumed-commit" standards as well.

FIG. 1 illustrates an example distributed computing system 100, in which implementations of the disclosure may operate. The distributed computing system 100 may include a service oriented architecture (SOA) (an information system architecture that organizes and uses distributed capabilities (services) for one or more applications). An SOA provides a uniform means to offer, discover, interact with and use capabilities (services) distributed over a network. Through the SOA, applications may be designed that combine loosely coupled and interoperable services.

In one example, the distributed computing system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one example, the ESB is a single bus that logically interconnects all available services and clients. Alternatively, the ESB may include multiple buses, each of which may logically interconnect different services and/or clients.

The distributed computing system 100 may include multiple computing devices 105, 110, 115 connected via a network 155. Network 155 may be a public network (e.g., the internet), a private network (e.g., a local area network (LAN) or wide area network (WAN)), or a combination thereof. In one example, network 155 may include a wired or a wireless infrastructure, which may be provided by one or more wireless communications systems, such as a wireless fidelity (WiFi) hotspot connected with the network 155 and/or a wireless carrier system that can be implemented using various data processing equipment, communication towers, etc. Alternatively, the distributed computing system 100 may include a single computing device and/or the computing devices 105, 110 may be directly connected to each other.

Each computing device 105, 110, 115 may be a client computing device or a server computing device. Computing devices may be, for example, personal computers (PC), palm-sized computing devices, personal digital assistants (PDA), rackmount servers, tablet computers, notebook computers, mobile phones, etc. Computing device 105, computing device 110, and computing device 115 may each be a single machine, or may include multiple interconnected machines (e.g., server machines configured in a cluster).

Computing device 105, 110, 115 may include hardware devices may provide hardware functionality for performing computing tasks. Hardware devices may include one or more physical storage devices, one or more physical processing devices, other computing devices, or a combination thereof. One or more of hardware devices may be split up into multiple separate devices or consolidated into one or more hardware devices. Some of the hardware device shown may be absent from hardware devices and may instead be partially or completely emulated by executable code.

As discussed above, computing devices 105, 110, 115 may include physical processing devices. Physical processing devices may include one or more processors that are capable of executing the computing tasks discussed herein. Physical processing devices may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit (CPU).

In one implementation, computing devices 105, 110, 155 are connected to data stores 122, 123, 124. Data stores 122, 123, 124 may include a file system, a database, or other data storage arrangement. Data stores 122, 123, 124 may be internal to computing devices 105, 110, 115 or external and connected to computing device 105, 110, 115 either directly or via a network. Data stores 122, 123, 124 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, data stores 122, 123, 124 may be physical memory and may include volatile memory devices (e.g., random access memory (RAM)), non-volatile memory devices (e.g., flash memory, NVRAM), and/or other types of memory devices. In another example, data stores 122, 123, 124 may include one or more mass storage devices, such as hard drives, solid state drives (SSD)), other data storage devices, or a combination thereof. In a further example, data stores 122, 123, 124 may include a combination of one or more memory devices, one or more mass storage devices, other data storage devices, or a combination thereof, which may or may not be arranged in a cache hierarchy with multiple levels. In a further example, data stores 122, 123, 124 may include persistent memory that provides fault tolerance even when disconnected from a power supply and byte-addressable level access to data.

Computing device 105, computing device 110, and/or computing device 115 may host services, applications and/or other functionality that is available to other computing devices (e.g., to clients) on the distributed computing system 100. Alternatively, or in addition, computing devices 105, 110, 115 may act as clients that access services provided by other computing devices. In one example, the computing device 105 includes a transaction manager 120 (including instructions for a logging optimized protocol) 180, and a first resource manager 130. Computing device 110 includes a second resource manager 140 and computing device 115 includes a third resource manager 150.

A transaction coordinator, such as transaction manager 120, is a software module with computer readable instructions that coordinates multiple participants during a distributed transaction. A participant may be another transaction manager (not shown) or a resource manager. For example, if transaction manager 120 acts as coordinator for a distributed transaction, first resource manager 130, second resource manager 140, and third resource manager 150 may be participants to the distributed transaction.

A resource manager, such as resource managers 130, 140, 150, may be a software module with computer readable instructions that manages a storage system, which is typically a persistent and stable storage system. A resource manager may be an external system accessed by an application. A resource manager provides and enforces the ACID transaction properties for specific data and operations. Examples of resource managers include a relational database (which supports persistent storage of relational data), an executive information system (EIS), and the Java Message Service (JMS) provider (which manages transactional message delivery). Other examples of resource managers include other types of databases and file managers.

Transaction manager 120 may act as a master to coordinate distributed transactions. Although not specifically illustrated, computing devices 110, 115 may also include a transaction coordinator that can act as a master coordinator for a transaction. Coordinating a distributed transaction includes determining whether each participant can commit to a transaction, causing each participant to commit if all are able, and causing each participant to roll back the transaction if not all participants are able to commit.

As described in greater detail below, transaction manager 120 may coordinate a distributed transaction using a logging optimized protocol 180. As noted above, while implementations of the disclosure are discussed herein in terms of the two-phase commit protocol, other applications of the disclosure are also possible. This includes application to other types of distributed transactions, such as compensating transaction and three-phase commit protocol, as well as to other applications of distributed consensus, such as a leader election process. As such, the example of the two-phase commit protocol for distributed transactions should be considered an example application of implementations of the disclosure and not limiting to the disclosure.

The logging optimized protocol 180 may reduce the overall execution time (latency) of a transaction by implementing two optimizations for logging of the distributed transaction. The first optimization performs serialization of a transaction log record for the distributed transaction in parallel with receiving responses to prepare messages of the distributed transaction. The second optimization speculatively writes, in parallel with receiving responses to prepare messages of the distributed transaction, the transaction log record to persistent memory using byte-addressable chunks and a valid/invalid flag that is part of the log record.

The transaction manager 120 acts on behalf of a process that initiates a distributed transaction to coordinate participants of the distributed transaction. As part of coordinating the distributed transaction, the transaction manager 120 arrives at a commit or abort decision and may propagate that decision to participants.

In one example, transaction manager 120 coordinates a distributed transaction between first resource manager 130, second resource manager 140 and third resource manager 150. The transaction manager 120 may establish a new transaction upon receiving a request from a transaction application 112 to perform the transaction. A transaction application 112 may be any application that requests that operations be performed transactionally or that otherwise causes distributed transactions to be initiated. The transaction application 112 may be collocated with the transaction manager 120 (as shown), or may be located on a remote machine (e.g., on computing device 110 and/or 115).

Transaction manager 120 may initiate a logging optimized two-phase commit distributed transaction and determine all participants for the distributed transaction. Each resource manager 130, 140, 150 that participates in a distributed transaction may be a participant of the transaction. During a prepare phase (also referred to as a commit-request phase) of a two-phase commit distributed transaction, a participant is asked by the transaction manager 120 via a prepare message whether it can commit to the transaction. The prepare message asks whether the participant (e.g., resource manager 130, 140, 150) can guarantee its ability to commit the transaction branch.

Upon receiving the prepare message, the resource manager 130, 140, 150 performs an action or set of actions. Typically, the resource manager 130, 140, 150 generates a snapshot of its state before performing any additional operations to enable the resource manager 130, 140, 150 to roll back to the current state if appropriate. If a resource manager 130, 140, 150 can commit its work, it records stably the information it utilizes to do so, then replies affirmatively to the transaction manager 120 with a commit response. A negative reply by the resource manager 130, 140, 150 to the transaction manager 120 reports failure for any reason. After making a negative reply (abort message) to the transaction manager 120 and rolling back its work, the resource manager 130, 140, 150 can discard any knowledge it has of the transaction branch During a commit phase of a logging optimized two-phase commit distributed transaction, the transaction manager 120 issues all resource managers 130, 140, 150 an actual instruction to commit or roll back the transaction branch, as the case may be. All resource managers 130, 140, 150 commit or roll back changes to shared resources and then return status to the transaction manager 120. The transaction manager 120 can then discard its knowledge of the global transaction.

In one implementation, before issuing requests to commit in the commit phase, the transaction manager 120 stably records the fact that it decided to commit, as well as a list of all involved resource managers 130, 140, 150. The transaction manager may record this information in a transaction manager (TM) log record in data store 122. The TM log record 125 may include an identifier of the coordinator (e.g., transaction manager 120) of the transaction, an address of the coordinator, an identification of the transaction, a process identification of a process that started the transaction, a description of the transaction, identification of other participants (e.g., resources managers 130, 140, 150) of the transaction, a timestamp indicating when the transaction was started, and/or additional data.

In implementations of the disclosure, the recording of information to the TM log record 125 by the transaction manager 120 is optimized as part of the logging optimized protocol 180 for distributed transactions. As discussed above, the logging optimized protocol 180 may reduce the overall execution time (latency) of a transaction by implementing two optimizations for logging of the transaction. The first optimization performs serialization of a log record for the transaction in parallel with a voting phase of the transaction. The second optimization speculatively writes the log record to persistent memory using byte-addressable persistent memory accesses and a speculative indicator corresponding to the TM log record 125. The first and second optimizations are described in further detail below with respect to FIGS. 2A and 2B.

Figure 2A:
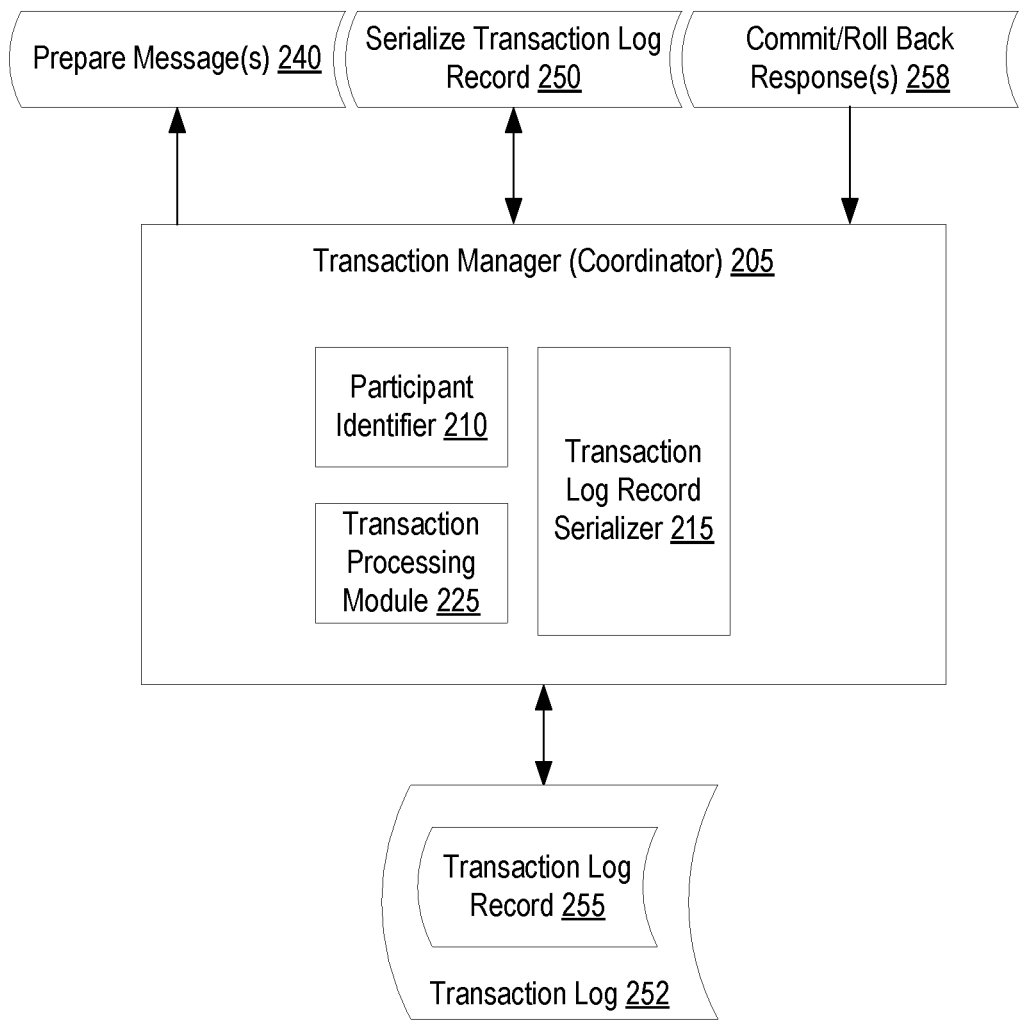
FIGS. 2A and 2B depict block diagrams of an example transaction manager that enhances an implementation of logging decision outcomes of distributed transactions, in accordance with one or more aspects of the disclosure.

FIG. 2A is a block diagram illustrating a transaction manager 205 that uses a logging optimized two-phase commit protocol for distributed transactions, in accordance with implementations of the disclosure. Transaction manager 205 may be the same as transaction manager 120 described with respect to FIG. 1. In one example, the transaction manager 205 includes a participant identifier 210, a transaction log record serializer 215, and a transaction processing module 225. The transaction manager 205 may act as a coordinator for a distributed transaction. Accordingly, transaction manager 205 may initiate and manage a distributed transaction.

A transaction application, such as transaction application 112 described with respect to FIG. 1, invokes the transaction manager 205 to coordinate a distributed transaction. When the transaction manager 205 receives a request (e.g., from a client) to initiate a new transaction, the transaction processing module 225 generates the new transaction, the new transaction having a unique transaction identifier. Since multiple clients and/or resources may participate in a transaction, the new transaction has a transaction context, which is associated with the transaction identifier. The transaction context provides an association between transactional operations on the participant resources and the clients or services invoking those operations. The transaction identifier is sent to the entity (e.g., client) that requested the transaction. The requestor (e.g., client) may then send the transaction identifier to each entity (e.g., additional client, application, resource manager, etc.) that is a participant to the transaction. Alternatively, the requestor may notify transaction manager 205 of the participants, and transaction manager 205 may send the transaction identifier to each of the identified participants.

The transaction manager 205 maintains a log of transactions for which that transaction manager acts or has acted as a transaction coordinator. In one example, the transaction processing module 225 adds an entry (transaction log record 255) for each new transaction to a transaction log 252. The transaction processing module 225 may record in the transaction log record 255 an identification of the transaction associated with an entry (e.g., a transaction identification number), a process identification of the process (e.g., client) that initiated the transaction, a description of the transaction, a timestamp identifying when the transaction was started, participants of the transaction and their addresses, and/or additional data about the transaction.

Once a transaction is generated, participant identifier 210 determines one or more resource managers that are to participate in the distributed transaction. In one example, participant identifier 210 receives identification of specific resource managers and/or types of resource managers that are to participate in the transaction from the transaction application. Alternatively, or in addition, participant identifier 210 may automatically determine participants for the distributed transaction. Participants may be determined, for example, based on a type of transaction that is to be performed. In one example, participant identifier 210 accesses a service directory to identify appropriate resource managers to participate in a particular transaction.

Participant identifier 210 additionally performs participant registration (also known as resource enlistment). Any resources that are to be modified, accessed, or otherwise affected by the transaction are registered with the transaction.

Transaction processing module 225 is responsible for actually coordinating the distributed transaction. The transaction processing module 225 administers the logging optimized two-phase commit transaction protocol. Accordingly, during a prepare phase of a logging optimized two-phase commit distributed transaction, the transaction processing module 225 sends a prepare message 240 to each participant asking whether the participant can commit to the transaction. If the participant can commit to the transaction, it sends a commit response 258 back to the transaction manager 205. If the participant cannot commit to the transaction, it sends an abort response 258 (also known as a rollback response) to the transaction manager 205.

While waiting for the commit or roll back responses from the participants to the distributed transaction, the transaction log record serializer 215 may serialize the transaction log record 255 in parallel with receiving the commit and/or roll back responses 258. In some implementations, the serialization of the transaction log record 255 by transaction log record serializer 215 may also occur while the transaction processing module 225 is sending the prepare messages 240 to the participants. Conventional distributed protocol transaction systems had performed the transaction log record serialization subsequent to receiving the commit and/or roll back responses instead of in parallel.

Serialization of the transaction log record 255 by the transaction log record serializer 215 may include organizing and formatting information to be stored in the transaction log record 255 in a particular manner for persistent storage in the transaction log 252. As discussed above, the transaction log record 255 may include, but is not limited to, an identification of the transaction associated with an entry (e.g., a transaction identification number), a process identification of the process (e.g., client) that initiated the transaction, a description of the transaction, a timestamp identifying when the transaction was started and/or additional data, participants of the transaction and their addresses, and so on. If a participant sends back an abort (rollback) response, then the transaction log record serializer 215 may discard the serialized transaction log record 255 it had been generating and roll back the distributed transaction, as discussed below.

During a commit phase of a logging optimized two-phase commit distributed transaction, the transaction processing module 225 determines whether to commit a transaction based on the responses that it receives from the participants. Transaction processing module 225 may commit the transaction if all participants indicated that they were able to commit. For example, transaction processing module 225 may commit the transaction, and then asynchronously send commit confirmation messages to the participants to provide confirmation that the transaction was committed. The participants typically do not send any confirmation to the transaction coordinator that they committed the transaction, though in some implementations the participants may asynchronously send commit conformation messages to the transaction manager 205.

If one or more of the participants sent a roll back response 255 during the prepare phase of the transaction, then the transaction processing module 225 sends a roll back message (an abort command) 258 to each participant during the commit phase. Each participant then rolls back the transaction, and may send a confirmation to the transaction coordinator that the transaction was rolled back. Alternatively, the participants may not send confirmations that the transaction was rolled back. Messages such as the prepare message 240, rollback message 258, etc. may be sent to participants using the participant's addresses that are recorded in the transaction log 220.

It is possible for the transaction manager 205 or one or more participants to fail during a transaction. In some cases, transaction manager 205 or a participant may fail without knowing whether the transaction was successfully completed (committed). In such an instance, the transaction manager 205 may perform a recovery process, in which it reviews its transaction logs to find transactions that were in process during the failure. Transaction manager 205 may then report an outcome of the transaction to participants listed in the transaction log.

Figure 2B:
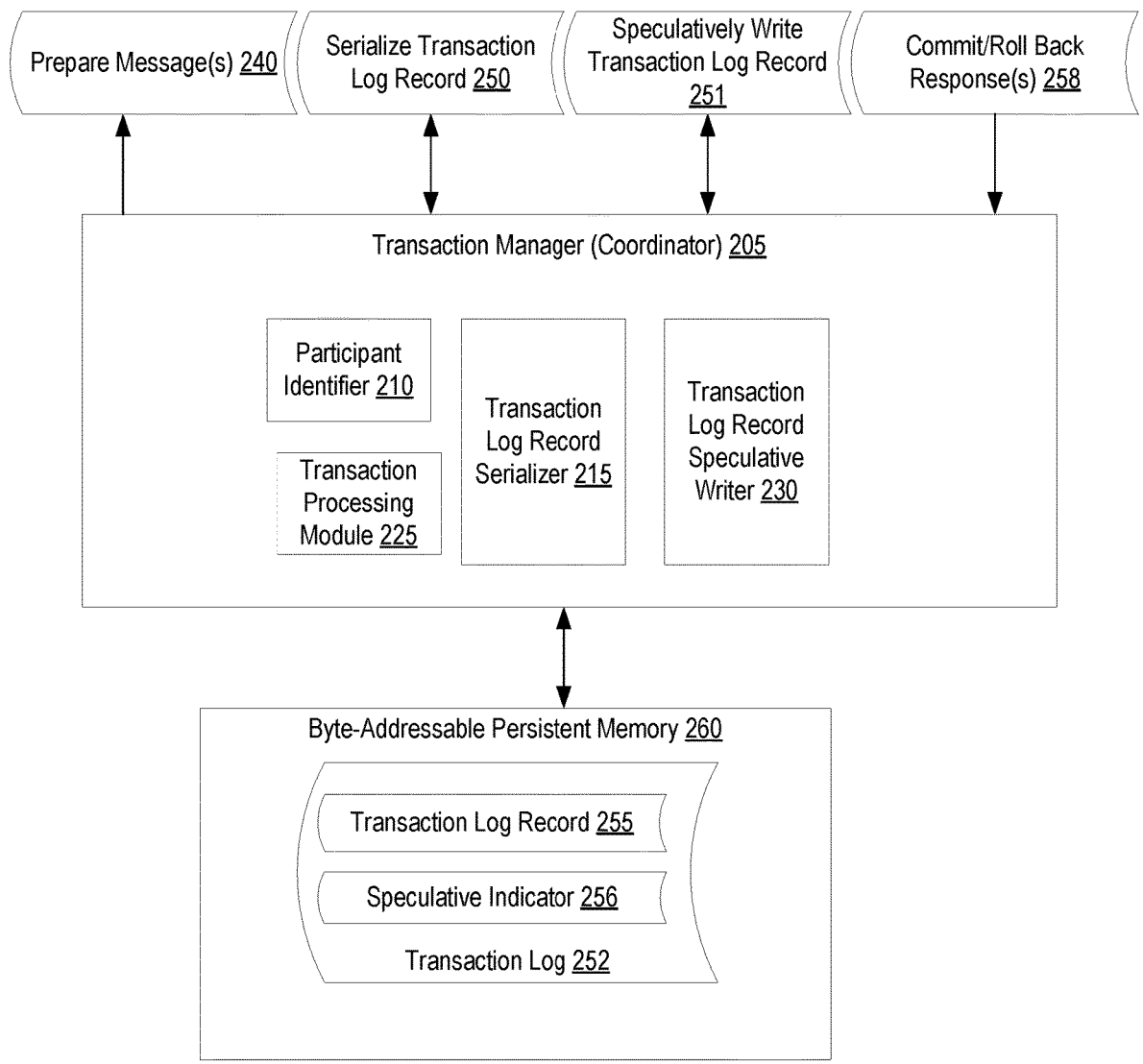

FIG. 2B illustrates a block diagram of a transaction manager 205 that participates in distributed transactions that use a logging optimized two-phase commit protocol, in accordance with implementations of the disclosure. The transaction manager 205 may include similar components as described with respect to FIG. 2A. As shown in FIG. 2B, transaction manager 205 may also include a transaction log record speculative writer 230.

As discussed above, the transaction manager 205 can coordinate a logging optimized two phase commit distributed transaction. During the prepare phase of such the distributed transaction, the transaction log record speculative writer 230 may speculatively write a serialized transaction log record 255 to the transaction log 252, while waiting for the commit or roll back responses 258 from the participants to the distributed transaction. As such, the transaction log record speculative writer 230 may speculative write the transaction log record 255 in parallel with receiving the commit and/or roll back responses 258. Conventional distributed protocol transaction systems had performed the transaction log record write to disk subsequent to receiving the commit and/or roll back responses 258 and not in parallel.

The transaction log record speculative writer 230 may perform the speculative transaction log record 255 write in parallel with receiving the commit/roll back responses 258 from participants when a byte-addressable persistent memory 260 is implemented to store the transaction log 252. Byte-addressable persistent memory 260 may include a hybrid memory type that combines the persistence characteristics of disk (i.e., fault tolerance; maintaining states even if power supply is removed) with the byte-addressable characteristics of main memory. Conventional distributed transaction system utilized disk storage to maintain transaction log records in order to fulfill fault tolerance requirements. Such disk storage utilizes block level operations, which introduce latency to the distributed transaction in terms of any changes/writes to the transaction log 252 involving a block level write operation (e.g., 4 KB block write operation). With the introduction of persistent memory 260 that provides fault tolerance and byte-addressable memory access, incremental writes to the transaction log 252 are now possible, reducing overall latency of the distributed transaction.

The transaction log record speculative writer 230 may utilize persistent memory 260 to store the transaction log 252 and to persist the transaction log record 255 via incremental speculative writes to the transaction log 252 in parallel with receiving the commit and roll back responses 258 during the prepare phase. The majority of the writes to the transaction log record 255 can occur prior to the outcome of the prepare phase being known. When a decision outcome for the distributed transaction is reached, the transaction log record 255 may be marked as valid or invalid with a minimum sized update by using a speculative indicator 256 corresponding to the transaction log record 255.

In one implementation, the speculative indicator 256 is part of the transaction log record 255. For example, the speculative indicator 256 may be one or more bits, a marker, a flag, etc. in the transaction log record 255. In other implementations, the speculative indicator 256 is separate from, but associated with, the transaction log record 255. For example, the speculative indicator 256 may include a pointer, a journal index, or other metadata structure that references, but is not a part of, the transaction log record 255. To use a file-system analogy, a record may be saved into a 'pending' folder, and then moved to a 'done' folder, without changing the contents of the record itself. The 'move' in this case (e.g., a pointer update) is a minimal-sized operation, even if the record itself is large.

The speculative indicator 256 may be initially set to indicate that the transaction log record 255 is speculative or invalid. If the outcome of the transaction is to commit, then the speculative indicator 256 can be updated to indicate that the transaction log record 255 is valid or non-speculative via a minimal write (e.g., 1 byte) to the speculative indicator 256 by the transaction log record speculative writer 230. For example, the minimal write may flip the speculative indicator 256 bit from invalid or valid, or may update a pointer that is the speculative indicator 256.

In some implementations, the transaction log record serializer 215 (described with respect to FIG. 2A) and the transaction log record speculative writer 230 can be combined in the logging optimized two phase commit protocol to allow for the majority of the transaction manager's 205 work to be performed in parallel with receiving commit/rollback responses 258 from participants. For example, the transaction log record serializer 215 may serialize the log record information as it is received and/or determined, and the transaction log record speculative writer 230 may then write these incremental serialization updates made by the transaction log record serializer 215 to the byte-addressable persistent memory 260 using byte-level writes. The transaction log record speculative writer 230 may then perform a minimum-sized update to the speculative indicator 256 corresponding to the transaction log record 255 once all responses 258 are received and a final decision (e.g., commit transaction) is made for the distributed transaction. This reduces overall latency of the distributed transaction by performing work in parallel during the prepare phase, rather than performing the serializing and persisting of the transaction log record 255 subsequent to receiving all responses 258 from the participants.

Figure 3:
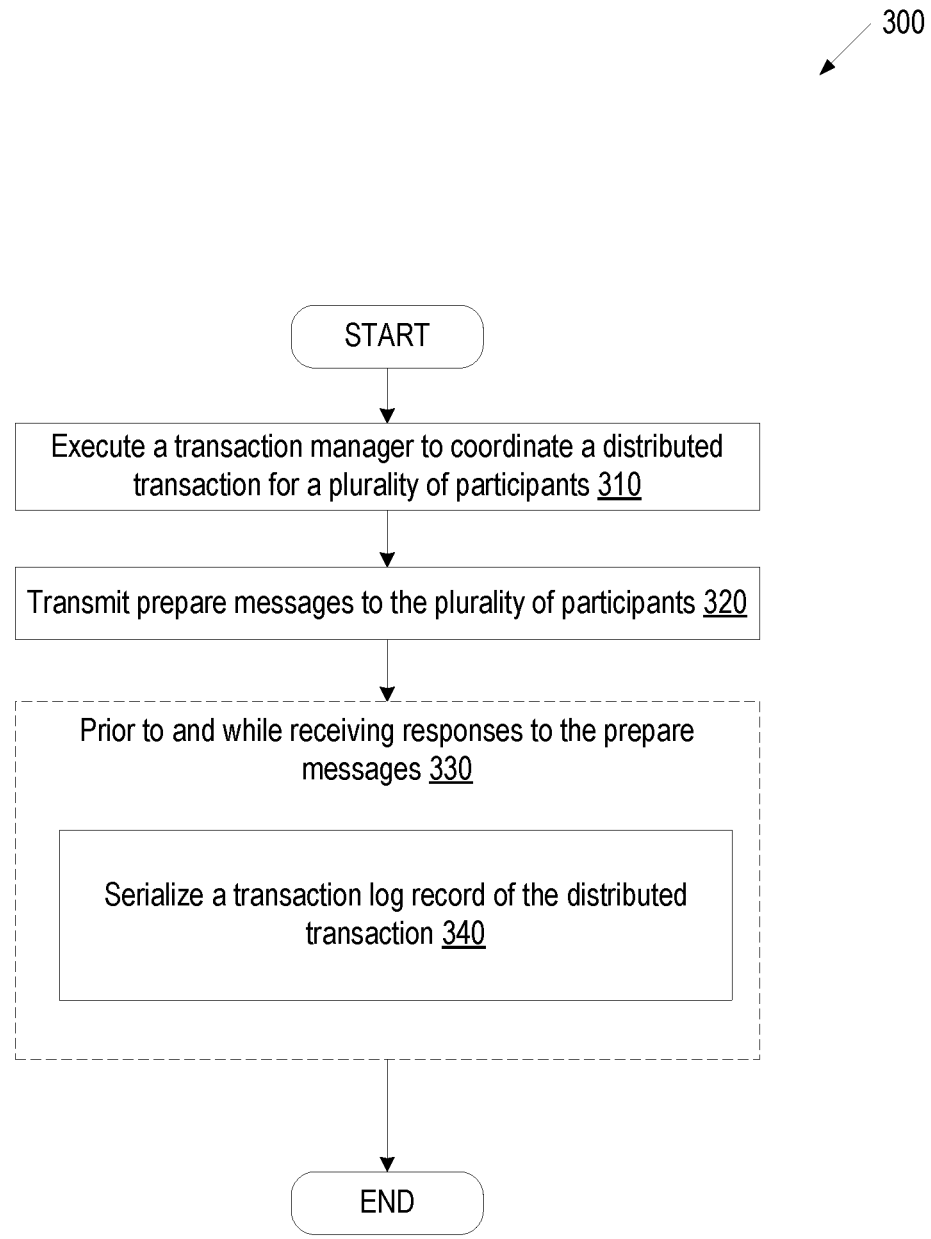
FIG. 3 depicts a flow diagram of an example method executed by a transaction manager to implement a first optimization to logging decision outcomes in a distributed transaction, in accordance with one or more aspects of the disclosure.
Figure 4:
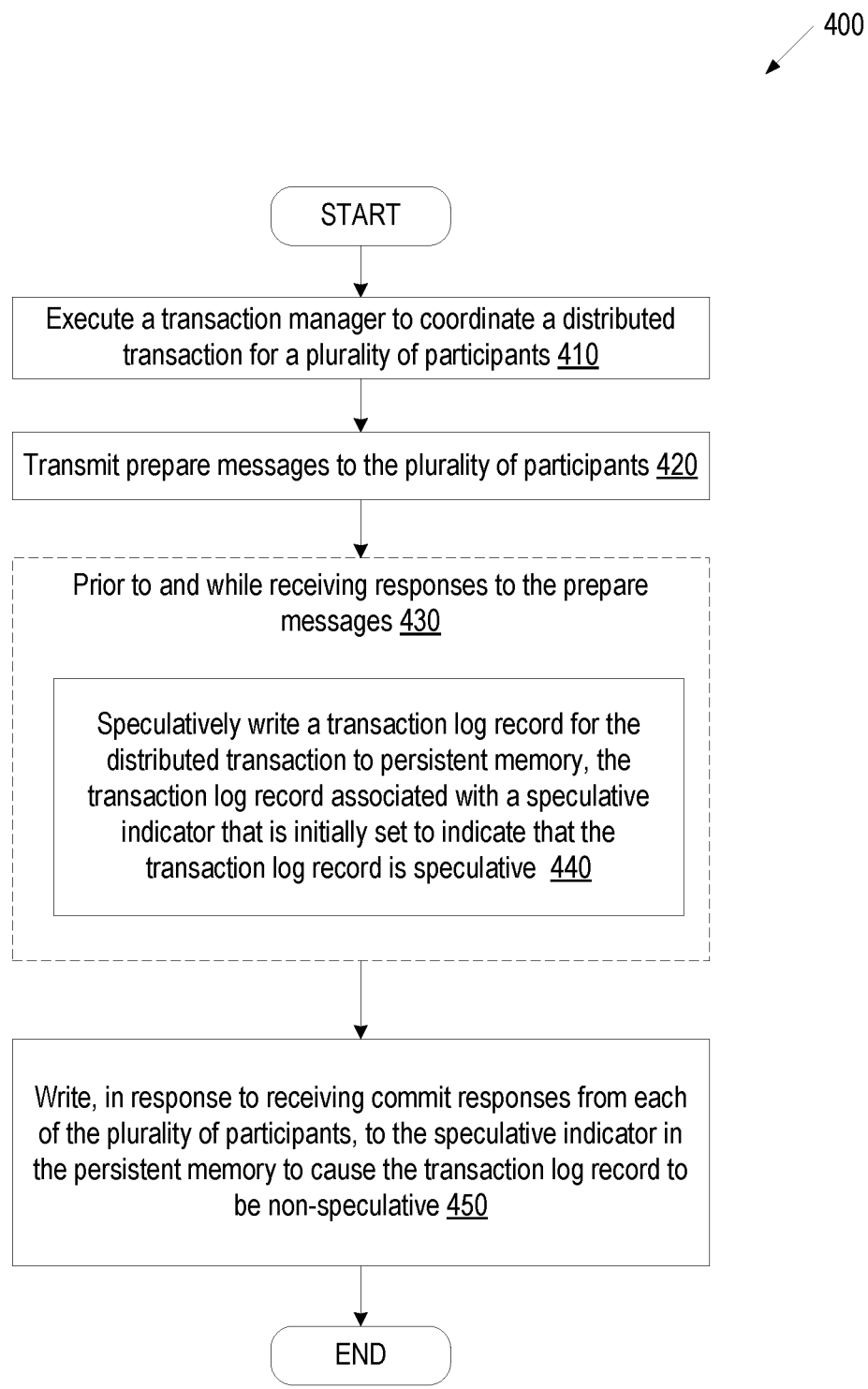
FIG. 4 depicts a flow diagram of an example method executed by a transaction manager to implement a second optimization to logging decision outcomes in a distributed transaction, in accordance with one or more aspects of the disclosure.

FIGS. 3 and 4 depict flow diagrams for illustrative examples of methods 300 and 400 for optimizing logging of decision outcomes in distributed transactions, in accordance with one or more aspects of the present disclosure. Method 300 illustrates an example process flow wherein a transaction manager serializing a transaction log record in parallel with receiving responses to prepare messages in a distributed transaction. Method 400 is an example process flow wherein a transaction manager speculatively writes a transaction log record in parallel with receiving responses to prepare messages in a distributed transaction.

Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 300 and 400 may be performed by computer system 100 as shown in FIG. 1.

Referring to FIG. 3, method 300 may be performed by processing devices of a server device or a client device and may begin at block 310. At block 310, a processing device may execute a transaction manager to coordinate a distributed transaction for a plurality of participants. In one implementation, the distributed transaction may be a two-phase commit distributed transaction. At block 320, the processing device may transmit prepare messages to the plurality of participants. A prepare message may be a query of whether a participant can guarantee its ability to commit a branch of the distributed transaction.

At block 330, the processing device may wait to receive response to the prepare message transmitted to the plurality of participants and may begin to start receiving responses from the plurality of participants. While the processing device is waiting and/or receiving responses at block 330, the processing device may also, at block 340, serialize a transaction log record of the distributed transaction. In some implementations, the transmission of prepare messages 320 and the serialization of the transaction log record 340 may be performed in parallel as well. A transaction log record includes an identifier of the coordinator of the transaction, an address of the coordinator, an identification of the transaction, a process identification of a process that started the transaction, a description of the transaction, identification of other participants of the transaction, a timestamp indicating when the transaction was started and/or additional data. In one implementation, serializing the transaction log record includes organizing and formatting information to be stored in the transaction log record in a particular manner for persistent storage in the transaction log. Responsive to completing the operations described herein above with reference to block 340, the method 300 may terminate.

Referring to FIG. 4, method 400 may be performed by processing devices of a server device or a client device and may begin at block 410. At block 410, a processing device may execute a transaction manager to coordinate a distributed transaction for a plurality of participants. In one implementation, the distributed transaction may be a two-phase commit distributed transaction. At block 420, the processing device may transmit prepare messages to the plurality of participants. A prepare message may be a query of whether a participant can guarantee its ability to commit a branch of the distributed transaction.

At block 430, the processing device may wait to receive response to the prepare message transmitted to the plurality of participants and may begin to start receiving responses from the plurality of participants. While the processing device is waiting and/or receiving responses at block 430, the processing device may also, at block 440, speculatively write a transaction log record of the distributed transaction to persistent memory. In some implementations, the transmission of prepare messages 420 and the speculative writing of the transaction log record 440 may be performed in parallel as well. A transaction log record includes an identifier of the coordinator (e.g., transaction manager) of the transaction, an address of the coordinator, an identification of the transaction, a process identification of a process that started the transaction, a description of the transaction, identification of other participants (e.g., resource managers, etc.) of the transaction, a timestamp indicating when the transaction was started, and/or additional data. In one implementation, the transaction log record is associated with a speculative indicator that is initially set to indicate that the transaction log record is speculative. The speculative indicator may include one or more bits, a marker, a flag, a pointer, and so on. When the speculative indicator is set to indicate that the transaction log record is speculative, the data of the transaction log record is not considered valid and is not accessible for read/write by other processes on the processing device.

As discussed above, the persistent memory where the transaction log record is speculatively written is memory that provides both fault tolerance attributes (e.g., data is saved when power supply is removed) and is byte-addressable. This allows for incremental speculative writes (of the transaction log record) to the persistent memory by the transaction manager in parallel with receiving responses to the prepare messages from the participants. As a result, the overall latency previously experienced in waiting to write the transaction log record to disk until after all responses are received from the participants is avoided (i.e. reduced).

At block 450, the processing device may, in response to receiving commit responses from each of the plurality of participants, write to the speculative indicator to cause the transaction log record to be non-speculative. This minimal incremental write to update the speculative indicator allows the transaction log record to become valid and accessible in the persistent memory by other processes. Responsive to completing the operations described herein above with reference to block 450, the method 400 may terminate.

Figure 5:
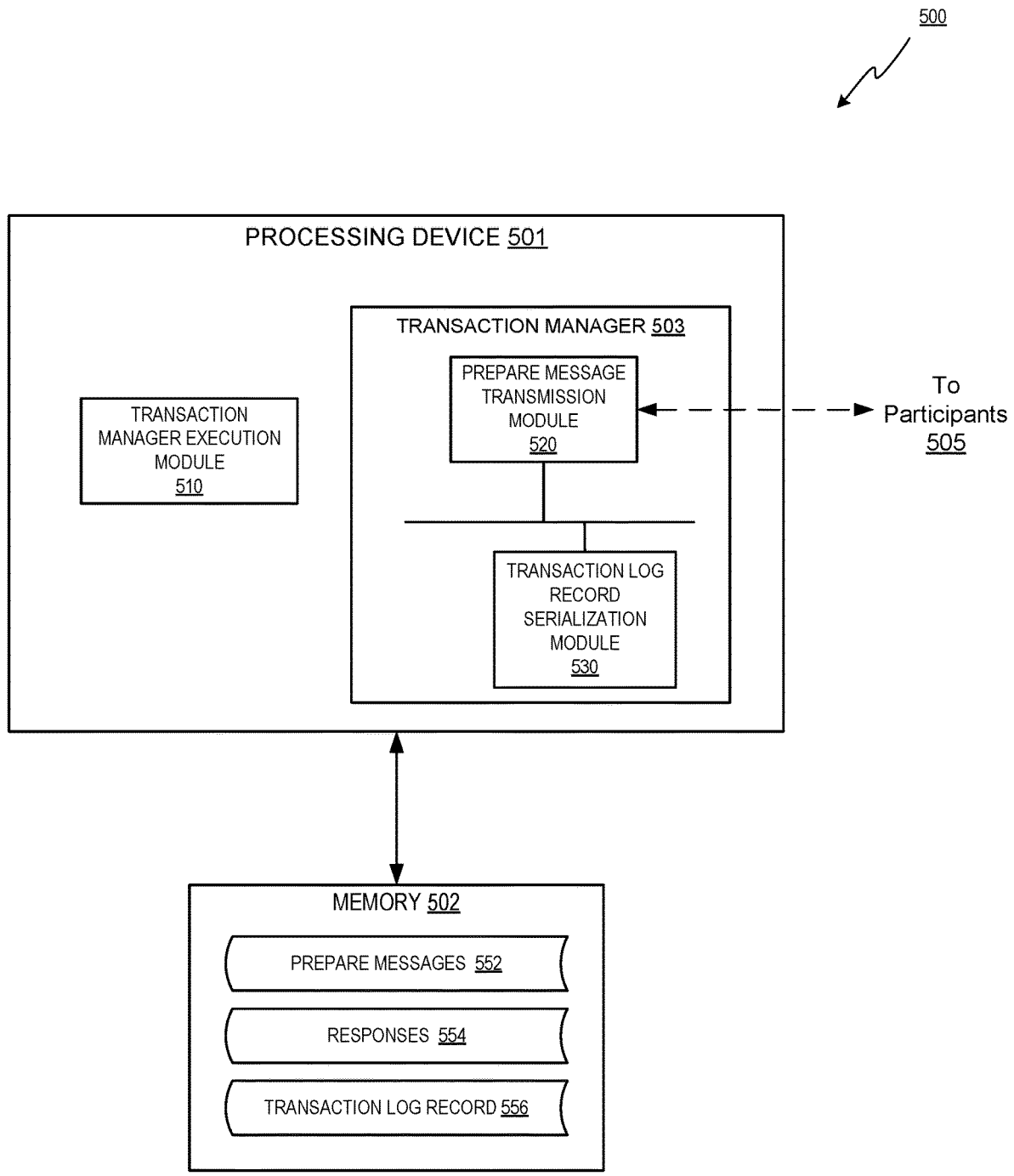
FIG. 5 depicts a block diagram of an example computer system in accordance with one or more aspects of the disclosure.

FIG. 5 depicts a block diagram of a computer system 500 operating in accordance with one or more aspects of the disclosure. Computer system 500 may be the same or similar to computer system 100 and may include one or more processing devices 501 and one or more memory devices 502. In the example shown, computer system 500 may include a transaction manager execution module 510, a prepare message transmission module 520, and a transaction log record serialization module 530.

Transaction manager execution module 510 may enable a processing device 501 to execute a transaction manager 503 to coordinate a distributed transaction for a plurality of participants 505. In one implementation, the distributed transaction may be a two-phase commit distributed transaction. Prepare message transmission module 520 may enable the processing device 501 executing the transaction manager 503 to transmit prepare messages (e.g., prepare messages 552 stored in memory 503) to the plurality of participants 505. A prepare message 552 may be a query of whether a participant 505 can guarantee its ability to commit a branch of the distributed transaction.

The processing device 501 may wait to receive responses (e.g., responses 554 in memory 502) to the prepare message 552 transmitted to the plurality of participants 505 and/or may begin to start receiving responses 554 from the plurality of participants 505. While the processing device is waiting and/or receiving responses 554, the transaction log record serialization module 530 may serialize a transaction log record (e.g., transaction log record 556 of in memory 502) of the distributed transaction. A transaction log record 556 may include an identifier of the coordinator of the transaction (e.g., transaction manager 503), an address of the coordinator, an identification of the transaction, a process identification of a process that started the transaction, a description of the transaction, identification of other participants of the transaction, a timestamp indicating when the transaction was started and/or additional data. In one implementation, the transaction log record serialization module 530 can serialize the transaction log record 556 by organizing and formatting information to be stored in the transaction log record 556 in a particular manner for storage in memory 502. In one implementation memory 502 used to store transaction log record 556 should be persistent memory that provides fault tolerance attributes.

Figure 6:
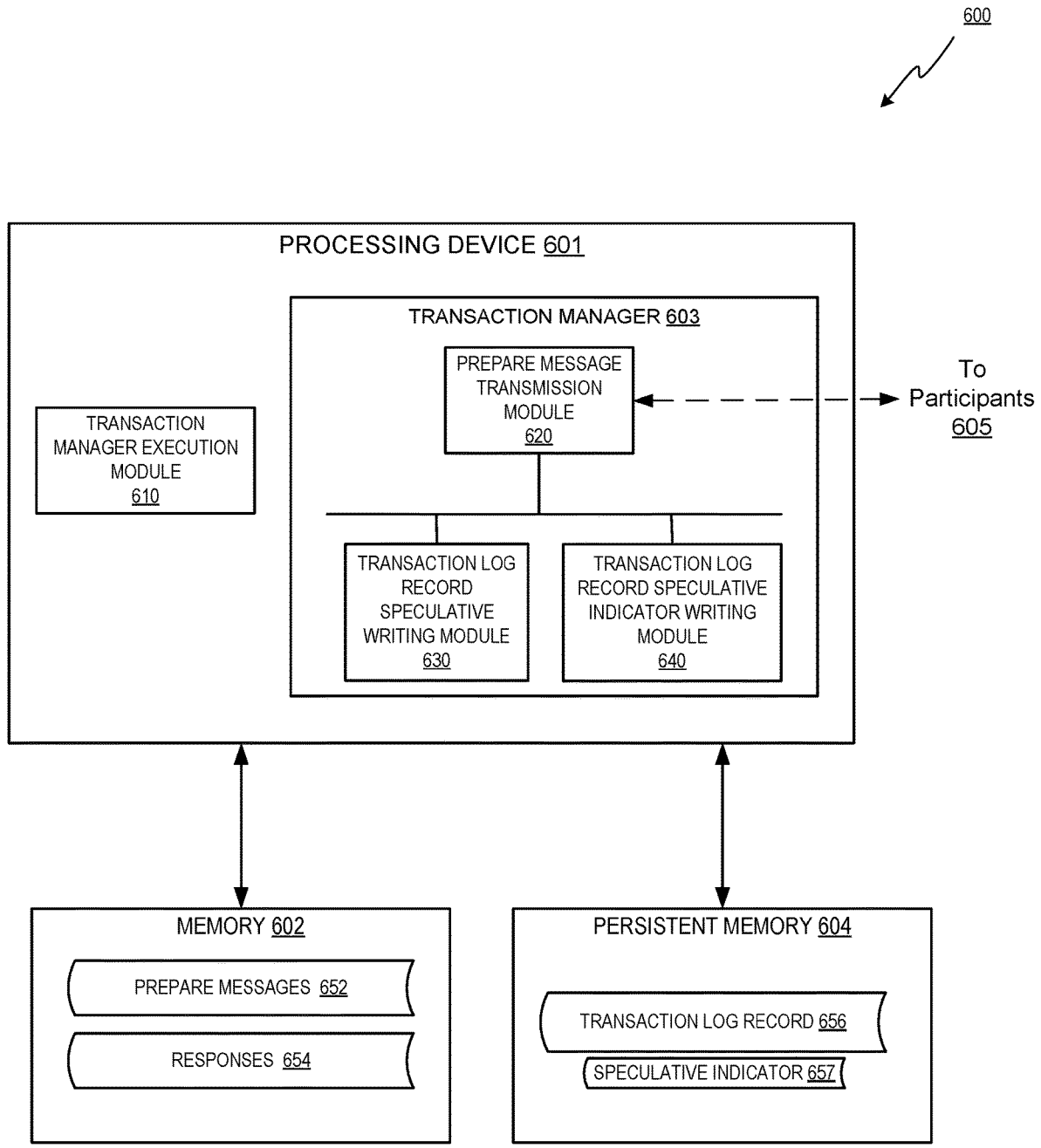
FIG. 6 depicts a block diagram of another example computer system in accordance with one or more aspects of the disclosure.

FIG. 6 depicts a block diagram of a computer system 600 operating in accordance with one or more aspects of the disclosure. Computer system 600 may be the same or similar to computer system 100 or 500 and may include one or more processing devices 601 and one or more memory devices 602, 604. In the example shown, computer system 600 may include a transaction manager execution module 610, a prepare message transmission module 620, a transaction log record speculative writing module 603, and a transaction log record speculative indicator writing module 640.

Transaction manager execution module 610 may enable a processing device 601 to execute a transaction manager 603 to coordinate a distributed transaction for a plurality of participants 605. In one implementation, the distributed transaction may be a two-phase commit distributed transaction. Prepare message transmission module 620 may enable the processing device 601 executing the transaction manager 603 to transmit prepare messages (e.g., prepare messages 652 stored in memory 603) to the plurality of participants 605. A prepare message 652 may be a query of whether a participant 605 can guarantee its ability to commit a branch of the distributed transaction.

The processing device 601 may wait to receive responses (e.g., responses 654 in memory 602) to the prepare message 652 transmitted to the plurality of participants 605 and/or may begin to start receiving responses 654 from the plurality of participants 605. While the processing device is waiting and/or receiving responses 654, the transaction log record speculative writing module 630 may speculatively write a transaction log record 656 of the distributed transaction to persistent memory 604. A transaction log record 656 includes an identifier of the coordinator (e.g., transaction manager 603) of the transaction, an address of the coordinator, an identification of the transaction, a process identification of a process that started the transaction, a description of the transaction, identification of other participants (e.g., resource managers, etc.) of the transaction, a timestamp indicating when the transaction was started, and/or additional data. In one implementation, the transaction log record 656 is associated with a speculative indicator 657 that is initially set to indicate that the transaction log record 656 is speculative. The speculative indicator 657 may include one or more bits, a marker, a flag, a pointer, and so on. When the speculative indicator 657 is set to indicate that the transaction log record is speculative, the data of the transaction log record 656 is not considered valid and is not accessible for read/write by other processes on the processing device 601.

The persistent memory 604 where the transaction log record 656 is speculatively written is memory that provides both fault tolerance attributes (e.g., data is saved when power supply is removed) and is byte-addressable. This allows for incremental speculative writes (of the transaction log record 656) to the persistent memory 604 by the transaction log record speculative writing module 630 in parallel with receiving responses 654 to the prepare messages 652 from the participants 605. As a result, the overall latency previously experienced in waiting to write the transaction log record 656 to disk until after all responses 654 are received from the participants 605 is avoided (i.e. reduced).

The transaction log record speculative indicator writing module 640 may, in response to receiving commit responses 654 from each of the plurality of participants 605, write to the speculative indicator 657 in persistent memory 604 in order to cause the speculative indicator 657 to indicate that the transaction log record 656 is not speculative. This minimal incremental write to update the speculative indicator 657 allows the transaction log record 656 to become valid and accessible in the persistent memory 604 by other processes of the processing device 601.

Figure 7:
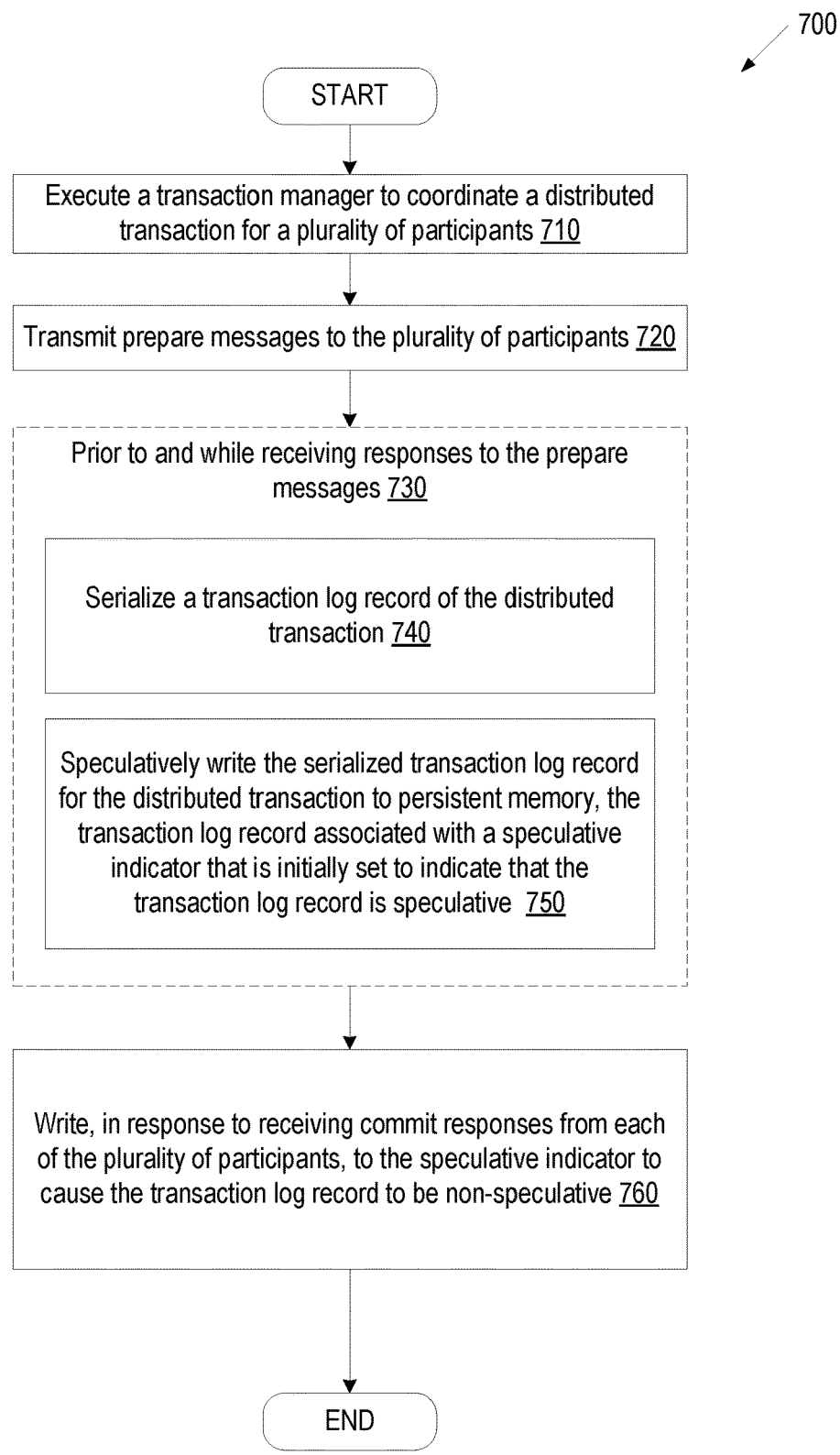
FIG. 7 depicts a flow diagram of another example method executed by a transaction manager to implement optimizations to logging decision outcomes in a distributed transaction, in accordance with one or more aspects of the disclosure.

FIG. 7 depicts a flow diagram for illustrative examples of method 700 for optimizing logging of decision outcomes in distributed transactions, in accordance with one or more aspects of the disclosure. Method 700 illustrates an example process flow wherein a transaction manager serializes and speculatively writes a transaction log record to persistent memory in parallel with receiving responses to prepare messages in a distributed transaction. Method 700 may be performed by processing devices that may comprise hardware (e.g., circuitry, dedicated logic, programmable logic, microcode, etc.), executable code (such as is run on a general purpose computer system or a dedicated machine), or a combination of both. Method 700's individual functions, routines, subroutines, or operations may be performed by one or more processors of the computer device executing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processes implementing method 700 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, method 700 may be performed by computer system 100 as shown in FIG. 1.

Referring to FIG. 7, method 700 may be performed by processing devices of a server device or a client device and may begin at block 710. At block 710, a processing device may execute a transaction manager to coordinate a distributed transaction for a plurality of participants. In one implementation, the distributed transaction may be a two-phase commit distributed transaction. At block 720, the processing device may transmit prepare messages to the plurality of participants. A prepare message may be a query of whether a participant can guarantee its ability to commit a branch of the distributed transaction.

At block 730, the processing device may wait to receive response to the prepare message transmitted to the plurality of participants and may begin to start receiving responses from the plurality of participants. While the processing device is waiting and/or receiving responses at block 730, the processing device may, at block 740, serialize a transaction log record of the distributed transaction. In some implementations, the transmission of prepare messages 720 and the serialization of the transaction log record 740 may be performed in parallel as well. A transaction log record includes an identifier of the coordinator of the transaction, an address of the coordinator, an identification of the transaction, a process identification of a process that started the transaction, a description of the transaction, identification of other participants of the transaction, a timestamp indicating when the transaction was started and/or additional data. In one implementation, serializing the transaction log record includes organizing and formatting information to be stored in the transaction log record in a particular manner for persistent storage in the transaction log.

While the processing device is waiting and/or receiving responses at block 730, the processing device may also, at block 750, speculatively write the serialized transaction log record of the distributed transaction to persistent memory. In one implementation, the transaction log record is associated with a speculative indicator that is initially set to indicate that the transaction log record is speculative. The speculative indicator may include one or more bits, a marker, a flag, a pointer, and so on. When the speculative indicator is set to indicate that the transaction log record is speculative, the data of the transaction log record is not considered valid and is not accessible for read/write by other processes on the processing device.

As discussed above, the persistent memory where the transaction log record is speculatively written is memory that provides both fault tolerance attributes (e.g., data is saved when power supply is removed) and is byte-addressable. This allows for incremental speculative writes (of the transaction log record) to the persistent memory by the transaction manager in parallel with receiving responses to the prepare messages from the participants. As a result, the overall latency previously experienced in waiting to write the transaction log record to disk until after all responses are received from the participants is avoided (i.e. reduced).

At block 760, the processing device may, in response to receiving commit responses from each of the plurality of participants, write to the speculative indicator in persistent memory in order to cause the transaction log record to be non-speculative. This minimal incremental write to update the speculative indicator allows the transaction log record to become valid and accessible in the persistent memory by other processes. Responsive to completing the operations described herein above with reference to block 760, the method 700 may terminate.

Figure 8:
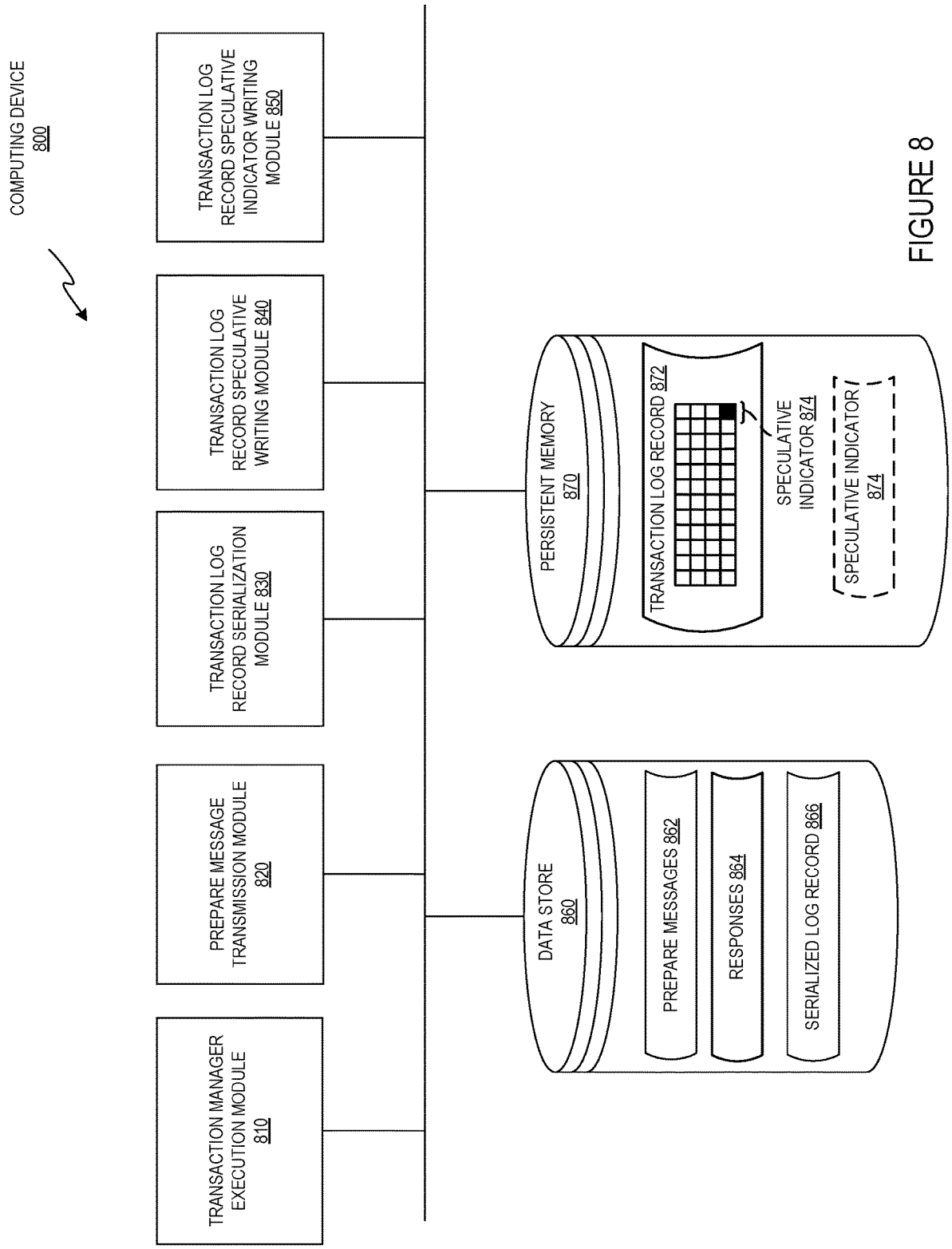
FIG. 8 depicts a block diagram of another example computer system in accordance with one or more aspects of the disclosure.

FIG. 8 depicts a block diagram of a computer system 800 operating in accordance with one or more aspects of the disclosure. Computer system 800 may be the same or similar to computer system 100, 500, or 600 and may include one or more processing devices and one or more memory devices.

In the example shown, computer system 800 may include a transaction manager execution module 810, a prepare message transmission module 820, a transaction log record serialization module 830, a transaction log record speculative writing module 840, and a transaction log record speculative indicator writing module 850. In one implementation, the modules 810-850 may be executable by the one or more processing devices from the one or more memory devices.

Transaction manager execution module 810 may enable a processing device to execute a transaction manager to coordinate a distributed transaction for a plurality of participants.

In one implementation, the distributed transaction may be a two-phase commit distributed transaction. Prepare message transmission module 820 may enable the processing device executing the transaction manager to transmit prepare messages (e.g., prepare messages 852 stored in data store 860) to the plurality of participants. A prepare message 852 may be a query of whether a participant can guarantee its ability to commit a branch of the distributed transaction.

The processing device may wait to receive responses (e.g., responses 864 in data store 860) to the prepare message 862 transmitted to the plurality of participants and/or may begin to start receiving responses 864 from the plurality of participants. While the processing device is waiting and/or receiving responses 864, the transaction log record serialization module 830 may serialize a transaction log record 866 of the distributed transaction and storing this serialized transaction log record 866 in memory, such as data store 860. A transaction log record includes an identifier of the coordinator of the transaction (e.g., transaction manager), an address of the coordinator, an identification of the transaction, a process identification of a process that started the transaction, a description of the transaction, identification of other participants (e.g., resource managers) of the transaction, a timestamp indicating when the transaction was started and/or additional data. In one implementation, serializing the transaction log record 866 includes organizing and formatting information to be stored in the transaction log record in a particular manner for persistent storage in the transaction log.

Furthermore, while the processing device is waiting and/or receiving responses 864, the transaction log record speculative writing module 840 may speculatively write the serialized transaction log record 866 of the distributed transaction to persistent memory 870 as transaction log record 872. In one implementation, the transaction log record 872 is associated with a speculative indicator 874 that is initially set to indicate that the transaction log record 872 is speculative. The speculative indicator 874 may include one or more bits, a marker, a flag, a pointer, and so on. For example, in one implementation, the speculative indicator 874 may be part of the transaction log record 872. In other implementations, the speculative indicator 874 references, but is not a part of, the transaction log record 872. When the speculative indicator 874 is set to indicate that the transaction log record is speculative, the data of the transaction log record 872 is not considered valid and is not accessible for read/write by other processes on the processing device.

The persistent memory 870 where the transaction log record 872 is speculatively written is memory that provides both fault tolerance attributes (e.g., data is saved when power supply is removed) and is byte-addressable. This allows for incremental speculative writes (of the transaction log record 872) to the persistent memory 870 by the transaction log record speculative writing module 840 in parallel with receiving responses 864 to the prepare messages 862 from the participants. As a result, the overall latency previously experienced in waiting to write the transaction log record 872 to disk until after all responses 864 are received from the participants is avoided (i.e. reduced).

The transaction log record speculative indicator writing module 850 may, in response to receiving commit responses 864 from each of the plurality of participants, write to the speculative indicator 874 in persistent memory 870 in order to cause the speculative indicator 874 to indicate that the transaction log record 872 is not speculative. This minimal incremental write to update the speculative indicator 874 allows the transaction log record 872 to become valid and accessible in the persistent memory 870 by other processes of the processing device.

Figure 9:
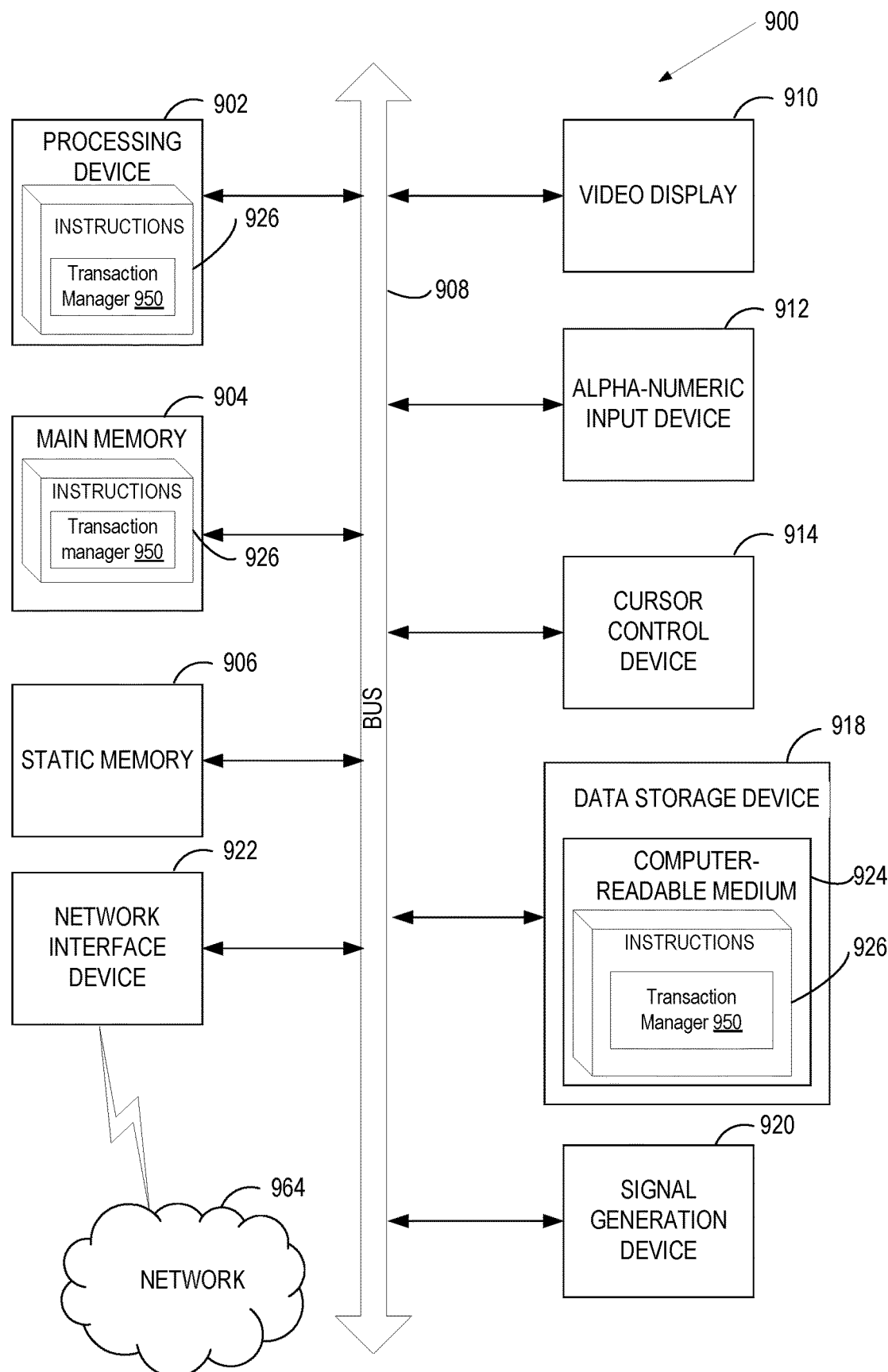
FIG. 9 depicts a block diagram of an illustrative computing device operating in accordance with the examples of the disclosure.

FIG. 9 depicts a block diagram of a computer system operating in accordance with one or more aspects of the present disclosure. In various illustrative examples, computer system 900 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

Data storage device 916 may include a non-transitory computer-readable storage medium 924 on which may store instructions 926 encoding any one or more of the methods or functions described herein, including instructions for implementing methods 300, 400, or 700 and for transaction manager 950 (which may be the same as transaction manager 120 of FIG. 1) and the modules illustrated in FIGS. 1, 2A, 2B, 5, 6, and 8.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: executing, by a processing device, a transaction manager to coordinate a distributed transaction for a plurality of participants, transmitting, by the processing device via the transaction manager, prepare messages to the plurality of participants, and while waiting to receive responses from each of the plurality of participants, serializing a transaction log record of the distributed transaction.

Example 2 is a method of example 1 wherein serializing the transaction log record comprises: identifying information of the distribution transaction, ordering the identified information in the transaction log record, and formatting the ordered information consistent with a determined format for the transaction log record.

Example 3 is a method of any one of examples 1-2, wherein the information of the distributed transaction comprises: a transaction identifier (ID), a coordinator ID of the transaction manager, and respective participant IDs corresponding to each of the plurality of participants.

Example 4 is a method of any one of examples 1-3 wherein the information of the distributed transaction further comprises at least one of: a process ID of a participant of the plurality of participants that started the distributed transaction, a description of the distributed transaction, or a timestamp indicating when the transaction was started.

Example 5 is a method of any one of examples 1-4, wherein the log record comprises a plurality of transaction IDs corresponding to each of the plurality of participants.

Example 6 is a method of any one of examples 1-5, wherein responsive to receiving an abort response from at least one participant of the plurality of participants: rolling back the distributed transaction, and erasing the transaction log record from memory.

Example 7 is a method of any one of examples 1-6, wherein the distributed transaction executes using a two-phase commit distributed transaction protocol.

Example 8 is a method of any one of examples 1-7, wherein the transaction log record is stored in memory of a computing device while the transaction manager performs the serializing of the transaction log record, wherein the computing device comprises the processing device executing the transaction manager.

Example 9 is a method of any one of examples 1-8, wherein the serialized transaction log record is persisted responsive to receiving commit responses from all of the plurality of participants.

Example 10 is a method comprising: executing, by a processing device, a transaction manager to coordinate a distributed transaction for a plurality of participants, transmitting, by the processing device via the transaction manager, prepare messages to the plurality of participants, while waiting to receive responses from each of the plurality of participants, speculatively writing a transaction log record for the distributed transaction to persistent memory, the transaction log record associated with a speculative indicator that initially indicates that the transaction log record is speculative, and responsive to receiving commit responses from each of the plurality of participants, updating the speculative indicator to cause the transaction log record to be non-speculative.

Example 11 is a method of example 10, wherein the persistent memory is byte-addressable persistent memory.

Example 12 is a method of any of examples 10-11, wherein the transaction log record is serialized by the transaction manager prior to the speculative writing.

Example 13 is a method of any of examples 10-12, wherein speculatively writing the transaction log record further comprises performing iterative speculative writes of the transaction log record responsive to updates to the transaction log record by the transaction manager.

Example 14 is a method of any of examples 10-13, wherein the speculative indicator comprises a valid bit.

Example 15 is a method of any of examples 10-14, wherein the speculative indicator comprises at least one of a marker or a flag.

Example 16 is a method of any of examples 10-15, wherein the speculative indicator comprises a pointer.

Example 17 is a method of any of examples 10-16, further comprising the processing device to, responsive to receiving an abort response from one of the plurality of participants, writing to the transaction log record in the persistent memory, rolling back the distributed transaction, where the speculative indicator in the transaction log record remains set to indicate that the transaction log record is speculative.

Example 18 is a method of any of examples 10-17, wherein the distributed transaction executes using a two-phase commit distributed transaction protocol.

Example 19 is a method of any of examples 10-18, wherein the transaction log record is accessible in the persistent memory by other processes of the processing device responsive to the speculative indicator in the transaction log record indicating that the transaction log record is no longer speculative.

Example 20 is a system comprising: a memory; a processing device executing a transaction manager and operatively coupled to the memory, the processing device to: execute a transaction manager to coordinate a distributed transaction for a plurality of participants, transmit prepare messages to a plurality of participants of the distributed transaction, and while waiting to receive responses from each of the plurality of participants, serialize a transaction log record of the distributed transaction.

Example 21 is a system of example 20, wherein to serialize the transaction log record, the processing device further to: identify information of the distribution transaction, order the identified information in the transaction log record, and format the ordered information consistent with a determined format for the transaction log record.

Example 22 is a system of any of examples 20-21, wherein the information of the distributed transaction comprises at least one of: a transaction identifier (ID), an coordinator ID of the transaction manager, respective participant IDs corresponding to each of the plurality of participants, a process ID of a participant of the plurality of participants that started the distributed transaction, a description of the distributed transaction, or a timestamp indicating when the transaction was started.

Example 23 is a system of any of examples 20-22, wherein responsive to receiving an abort response from at least one participant of the plurality of participants: rolling back the distributed transaction, and erasing the transaction log record from memory.

Example 24 is a system of any of examples 20-23, wherein the transaction log record is stored in memory of a computing device while the transaction manager performs the serializing of the transaction log record, wherein the computing device comprises the processing device executing the transaction manager.

Example 25 is a system of any of examples 20-24, wherein the serialized transaction log record is persisted responsive to receiving commit responses from all of the plurality of participants.

Example 26 is a system comprising: a memory; and a processing device executing a transaction manager and operatively coupled to the memory, the processing device to: execute the transaction manager to coordinate a distributed transaction for a plurality of participants, transmit, by the transaction manager, prepare messages to the plurality of participants, while waiting to receive responses from each of the plurality of participants, speculatively write a transaction log record for the distributed transaction to persistent memory, the transaction log record associated with a speculative indicator that initially indicates that the transaction log record is speculative, and responsive to receiving commit responses from each of the plurality of participants, update the speculative indicator to cause the transaction log record to be non-speculative.

Example 27 is a system of example 26, wherein the persistent memory is byte-addressable persistent memory Example 28 is a system of any of examples 26-27, wherein the transaction log record is serialized by the transaction manager prior to the speculative writing, and wherein to speculatively write the transaction log record, the processing device is to perform iterative speculative writes of the transaction log record responsive to updates to the transaction log record by the transaction manager.

Example 29 is a system of any of examples 26-28, wherein the speculative indicator comprises at least one of a valid bit, a marker, a flag, or a pointer.

Example 30 is a system of any of examples 26-29, wherein the processing device is further to, responsive to receiving an abort response from one of the plurality of participants, write to the transaction log record in the persistent memory, rolling back the distributed transaction, where the speculative indicator in the transaction log record remains set to indicate that the transaction log record is speculative.

Example 31 is a system of any of examples 26-30, wherein the transaction log record is accessible in the persistent memory by other processes of the processing device responsive to the speculative indicator in the transaction log record indicating that the transaction log record is not speculative.

Example 32 is a non-transitory machine-readable storage medium storing instructions that cause a processing device to: execute a transaction manager to coordinate a distributed transaction of a plurality of participants, transmit, via the transaction manager, prepare messages to the plurality of participants, while waiting to receive responses from each of the plurality of participants, the transaction manager to: serialize a transaction log record of the distributed transaction, and speculatively write the serialized transaction log record for the distributed transaction to persistent memory, the transaction log record associated with a speculative indicator that initially indicates that the transaction log record is speculative, and responsive to receiving commit responses from each of the plurality of participants, updating, by the transaction manager, the speculative indicator to cause the transaction log record to be non-speculative.

Example 33 is a non-transitory machine-readable storage medium of example 32, wherein the processing device to serialize the transaction log record further comprises the processing device to: identify information of the distribution transaction, order the identified information in the transaction log record, and format the ordered information consistent with a determined format for the transaction log record, wherein the information of the distributed transaction comprises at least one of a transaction identifier (ID), an coordinator ID of the transaction manager, respective participant IDs corresponding to each of the plurality of participants, a process ID of a participant of the plurality of participants that started the distributed transaction, a description of the distributed transaction, or a timestamp indicating when the transaction was started.

Example 34 is a non-transitory machine-readable storage medium of any one of examples 32-33, wherein responsive to receiving an abort response from at least one participant of the plurality of participants, the processing device to: roll back the distributed transaction, and erase the transaction log record from memory.

Example 35 is a non-transitory machine-readable storage medium of any one of examples 32-34, wherein the persistent memory is byte-addressable persistent memory.

Example 36 is a non-transitory machine-readable storage medium of any one of examples 32-35, wherein the speculative indicator comprises at least one of a valid bit, a marker, a flag, or a pointer.

Example 37 is an apparatus comprising: means for executing a transaction manager to coordinate a distributed transaction of a plurality of participants, means for transmitting, via the transaction manager, prepare messages to the plurality of participants, means for serializing, while waiting to receive responses from each of the plurality of participants, a transaction log record of the distributed transaction, means for speculatively writing, while waiting to receive responses from each of the plurality of participants, the serialized transaction log record for the distributed transaction to persistent memory, the transaction log record associated with a speculative indicator that initially indicates that the transaction log record is speculative, and means for updating, responsive to receiving commit responses from each of the plurality of participants, the speculative indicator to cause the transaction log record to be non-speculative.

Example 38 is a non-transitory machine-readable storage medium of example 37, wherein the means for serializing the transaction log record further comprises: means for identifying information of the distribution transaction, means for ordering the identified information in the transaction log record; and means for formatting the ordered information consistent with a determined format for the transaction log record, wherein the information of the distributed transaction comprises at least one of a transaction identifier (ID), an coordinator ID of the transaction manager, respective participant IDs corresponding to each of the plurality of participants, a process ID of a participant of the plurality of participants that started the distributed transaction, a description of the distributed transaction, or a timestamp indicating when the transaction was started.

Example 39 is an apparatus of any one of examples 37-38, wherein the persistent memory is byte-addressable persistent memory.

Example 40 is an apparatus of any one of examples 37-39, wherein the speculative indicator comprises at least one of a valid bit, a marker, a flag, or a pointer.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method to optimize logging of a distributed transaction comprising:
   executing, by a processing device, a transaction manager to coordinate the distributed transaction for a plurality of participants;
   transmitting, by the processing device via the transaction manager, prepare messages to the plurality of participants;
   receiving, from the plurality of participants, a first set of responses to the prepare messages;
   serializing a transaction log record of the distributed transaction in view of the first set of responses in parallel with receiving, from the plurality of participants, additional responses to the prepare messages, wherein the first set of responses comprises at least one of: a commit vote or an abort vote;
   speculatively writing the serialized transaction log record in persistent memory while the transaction manager performs the serializing of the transaction log record, in parallel with receiving, from the plurality of participants, the additional responses to the prepare messages; and
   updating a speculative indicator associated with the distributed transaction to indicate validity of the transaction log record.

2. The method of claim 1 wherein serializing the transaction log record comprises:
   identifying information of the distribution transaction;
   ordering the identified information in the transaction log record; and
   formatting the ordered information consistent with a determined format for the transaction log record.

3. The method of claim 2 wherein the information of the distributed transaction comprises:
   a transaction identifier (ID);
   an coordinator ID of the transaction manager; and
   respective participant IDs corresponding to each of the plurality of participants.

4. The method of claim 3 wherein the information of the distributed transaction further comprises at least one of:
   a process ID of a participant of the plurality of participants that started the distributed transaction;
   a description of the distributed transaction; or
   a timestamp indicating when the transaction was started.

5. The method of claim 4, wherein the log record comprises a plurality of transaction IDs corresponding to each of the plurality of participants.

6. The method of claim 1, wherein responsive to receiving an abort response from at least one participant of the plurality of participants:
   rolling back the distributed transaction; and
   erasing the transaction log record from memory.

7. The method of claim 1, wherein the distributed transaction executes using a two-phase commit distributed transaction protocol.

8. The method of claim 1, wherein the transaction log record is stored in memory of a computing device, wherein the computing device comprises the processing device executing the transaction manager.

9. The method of claim 1, wherein the serialized transaction log record is persisted responsive to receiving commit responses from all of the plurality of participants.

10. A system comprising:
    a memory; and
    a processing device executing a transaction manager to optimize logging of a distributed transaction and operatively coupled to the memory, the processing device to:
    execute the transaction manager to coordinate the distributed transaction for a plurality of participants;

transmit, by the transaction manager, prepare messages to the plurality of participants;

receiving, from the plurality of participants, a first set of responses to the prepare messages;

serialize a transaction log record in view of the first set of responses in parallel with receiving, from the plurality of participants, additional responses to the prepare messages, wherein the first set of responses comprises at least one of: a commit vote or an abort vote;

speculatively write a transaction log record for the distributed transaction to persistent memory in parallel with receiving, from the plurality of participants, the additional responses to the prepare messages, wherein the transaction log record is serialized by the transaction manager prior to the speculative writing; and update a speculative indicator associated with the distributed transaction to indicate validity of the transaction log record.

11. The system of claim 10, wherein the persistent memory is byte-addressable persistent memory.

12. The system of claim 10, wherein to speculatively write the transaction log record, the processing device is to perform iterative speculative writes of the transaction log record responsive to updates to the transaction log record by the transaction manager.

13. The system of claim 10, wherein the speculative indicator comprises at least one of a valid bit, a marker, a flag, or a pointer.

14. The system of claim 10, wherein the processing device is further to, responsive to receiving an abort response from one of the plurality of participants, write to the transaction log record in the persistent memory, rolling back the distributed transaction, where the speculative indicator in the transaction log record remains set to indicate that the transaction log record is speculative.

15. The system of claim 10, wherein the transaction log record is accessible in the persistent memory by other processes of the processing device responsive to the speculative indicator in the transaction log record indicating that the transaction log record is no longer speculative.

16. A non-transitory machine-readable storage medium storing instructions that cause a processing device to optimize logging of a distributed transaction by performing:

execute a transaction manager to coordinate the distributed transaction of a plurality of participants;

transmit, via the transaction manager, prepare messages to the plurality of participants;

receive, from the plurality of participants, a first set of responses to the prepare messages;

serialize a transaction log record of the distributed transaction in view of the first set of responses in parallel with receiving additional responses, wherein the first set of responses comprises at least one of: a commit vote or an abort vote;

speculatively write the serialized transaction log record for the distributed transaction to persistent memory, in parallel with receiving the additional responses, the transaction log record associated with a speculative indicator that initially indicates that the transaction log record is speculative; and responsive to receiving commit responses from each of the plurality of participants, update, by the transaction manager, the speculative indicator to cause the transaction log record to be non-speculative.

17. The non-transitory machine-readable storage medium of claim 16, wherein to serialize the transaction log record, the processing device further to:

identify information of the distribution transaction;

order the identified information in the transaction log record; and format the ordered information consistent with a determined format for the transaction log record;

wherein the information of the distributed transaction comprises at least one of a transaction identifier (ID), a coordinator ID of the transaction manager, respective participant IDs corresponding to each of the plurality of participants, a process ID of a participant of the plurality of participants that started the distributed transaction, a description of the distributed transaction, or a timestamp indicating when the transaction was started.

18. The non-transitory machine-readable storage medium of claim 16, wherein responsive to receiving an abort response from at least one participant of the plurality of participants, the processing device to:

roll back the distributed transaction; and erase the transaction log record from memory.

19. The non-transitory machine-readable storage medium of claim 16, wherein the persistent memory is byte-addressable persistent memory.

20. The non-transitory machine-readable storage medium of claim 16, wherein the speculative indicator comprises at least one of a valid bit, a marker, a flag, or a pointer.

* * * * *